United States Patent [19]
Goldberg

[11] 3,918,760
[45] Nov. 11, 1975

[54] GUARD RAIL SAFETY LOCK
[76] Inventor: Morris I. Goldberg, 39 Locke Road, Newton, Mass. 02168
[22] Filed: Sept. 9, 1974
[21] Appl. No.: 504,370

Related U.S. Application Data
[63] Continuation of Ser. No. 235,242, March 16, 1972.

[52] U.S. Cl. ............................... 297/384; 297/253
[51] Int. Cl.² ............................................. A47C 1/08
[58] Field of Search ........... 297/253, 390, 255, 154, 297/150, 250, 254, 384; 248/166, 439, 436, 291, 293, 294; 5/331, 57 B; 211/178, 179; 292/262, 276, DIG. 17; 403/92.91; 49/394

[56] References Cited
UNITED STATES PATENTS

| | | | |
|---|---|---|---|
| 859,557 | 7/1909 | Hencke | 297/154 |
| 1,043,927 | 11/1912 | Harris | 297/154 X |
| 1,259,018 | 3/1918 | Hoover | 292/216 |
| 1,259,018 | 3/1918 | Hoover | 49/394 X |
| 2,715,540 | 8/1955 | Potter | 292/91 X |
| 2,758,868 | 8/1956 | Waymire et al. | 49/394 X |
| 3,146,026 | 8/1964 | Berlin | 297/255 |
| 3,262,736 | 7/1966 | Merelis | 297/253 |
| 3,387,883 | 6/1968 | Berlin | 297/253 |
| 3,583,761 | 6/1971 | Hume et al. | 297/253 |

FOREIGN PATENTS OR APPLICATIONS
| | | | |
|---|---|---|---|
| 986,522 | 3/1951 | France | 16/142 |

*Primary Examiner*—James T. McCall
*Attorney, Agent, or Firm*—Robert E. Meyer

[57] ABSTRACT

A guard rail safety lock for an infant's automobile seat comprising a U-shaped member pivotally mounted to the side frame in a position to closely overlie the guard rail in a first position and to clear the guard rail in a second position.

2 Claims, 4 Drawing Figures

GUARD RAIL SAFETY LOCK

This is a continuation of application Ser. No. 235,242, filed on Mar. 16, 1972.

BRIEF SUMMARY OF THE INVENTION

This invention relates to infant furniture and more particularly to a safety lock for the guard rail of an infant's automobile seat.

It is customary to provide special seats for very small children for use in automobiles. Typically such seats are used from the time the child can first sit up comfortably until such time as the child is old enough and tall enough to sit comfortably and securely on the regular automobile seat. Such seats are designed to rest on he regular seat to raise the child high enough so that he may look out ot the window and to be secured to the frame of the automobile through interaction with the standard seat (lap) belt.

A typical such infant's car seat is provided with a tubular metal frame normally about ⅝ inch in diameter having a portion designed to rest on the automobile seat, with a rearward extension designed to pass into the crack between the bottom and the back of the automobile seat and a back portion designed to rest against the back of the automobile seat.

The car seat is provided with a seat cushion, a back cushion, a head rest, shoulder straps attached to the back portion passing over the back cushion with loops at the lower end adapted to receive the standard auto seat belt and a padded guard rail adapted to swing between a horizontal position surrounding the child and a raised position over and behind the child's head to permit the easy passage of the child into and out of the seat.

A crotch strap is normally provided with one end attached to the frame beneath the seat cushion and the other end detactably connected to the guard rail passing between the child's legs when the child is sitting in the seat, to prevent the child from raising the guard rail or when the child is very small from slipping out through the space between the guard rail and the seat cushion. While such seats are particularly designed for use in automobiles they are also designed to stand on any flat surface and are therefore useful as auxiliary infant seats any place such seating is desired. Of course away from an automobile, since there is no seat belt, the shoulder belts become inoperative.

One basic requirement of such seats is that they be so arranged that the child may be removed easily and quickly, especially should an emergency situation develop. Thus any restraining member must be of a quick-release type, easily reached by the adult driver. The end of the crotch strap that passes over the padded guard rail is normally fastened by a snap fastener, the two halves of which are placed at a spaced interval along the strap so that the strap can pass up and over the padded guard rail and be snapped in place back on itself. Theoretically under certain impact conditions such a fastener might pop open. In addition a child at the upper end of the age group that uses such seats has the manual dexterity and strength to open such fasteners either intentionally or accidentally.

If the child's seat is used properly with the automobile seat belt passing over the child's lap and the shoulder belts in place over the child's shoulders and connected with the automobile seat belt, the child will be held securely whether the crotch strap is fastened or

2 not. There always is the possibility that the child's seat will not be used properly as by not using the automobile seat belt at all or by passing the automobile seat belt over the seat rather than over the lap of the child. Under such circumstances it is desirable to provide a supplementary locking means to keep the guard rail in place even if the crotch strap becomes disconnected to prevent the guard rail from flying up or being raised by the child.

It is the object of this invention to provide such a supplementary locking means in such manner as to be easily engaged and disengaged as by the driver, should the child's seat be placed in the front seat of the automobile, but difficult to be reached by the child.

DETAILED DESCRIPTION

Figure 1:
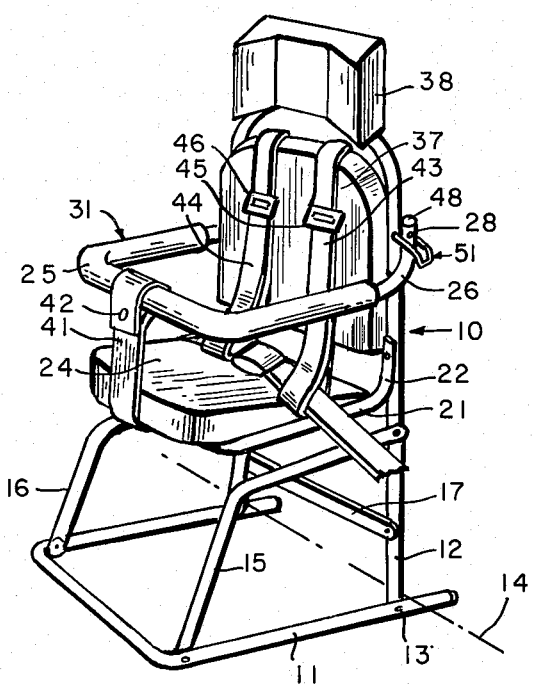
FIG. 1 is a perspective view of a child's seat incorporating the safety lock of the present invention.

A typical infant's car seat indicated generally at 10 is shown in FIG. 1. Seat 10 comprises a generally U-shaped bottom frame member 11 and an upstanding generally U-shaped back frame member 12 both formed of suitable light-weight metal tubing and joined as by rivets 13. Frame 11 is adapted to rest on an automobile seat (not shown) and frame 12 is adapted to rest against the back of the automobile seat. Preferably frame 12 is joined to frame 11 so that there is an extended portion of frame 11 adapted to slide into the crack indicated at 14 between the bottom cushion and the back cusion of the automobile seat. A pair of curved tubular brace members 15 and 16 are provided between an intermediate position on frame 12 and a position near the closed forward end of frame 11 and a cross brace 17 is provided between the two arms of frame 12 intermediate the intersection with brace members 15 and 16 and the intersection with frame 11 to strengthen and stabilize the structure. A U-shaped seat cushion support member 21 is provided to extend substantially horizontally to bottom frame 11 from the forward side of back frame 12 to which it is attached as by rivets extending through upturned end portion 22 provided for this purpose with the ends flattened and curved to conform to tubular back frame member 12. Seat cushion 24 is supported on the front portion of support member 21 and on a flat cross-bar (not shown) arranged at an intermediate position between the side arms of support member 21.

Guard rail 25 is a generally U-shaped member similar in shape but with slightly greater length and width dimensions than said support member 21 having upturned end portions 26 pivotally mounted to the sides of back fram 12 and 28. Guard rail 25 is covered with padding as indicated at 31. Guard rail 25 is adapted to rotate around pivots 28 between a raised position that extends over and behind back frame 12 and a lower position where it is mounted substantially parallel to bottom frame 11 by the contact of the back of upturned end portion 26 with a flat cross-bar 32 mounted behind said frame 12 and extending between the sides of back frame 12.

Back cushion 37 is mounted between the sides of back frame 12 on cross-bar 32 and on a cross-bar (not shown) mounted upon the rivets holding seat support member 21. A head rest 38 is provided, mounted at the upper end of back frame 12. Crotch strap 41 is attached at one end to the cross-bar supporting seat cushion 24 and passes under the front portion of seat support member 21 up and over padded guard rail 25 where it is detachably fastened to itself by snap fastener 42, the two portions of which are provided at a spaced internal in crotch strap 41. Shoulder straps 43 and 44 are provided passing from cross bar 32 up and over the top of back cushion 37, down the front of back cushion 37 leading to length-adjusting buckles 45 and 46 forming a loop in each of shoulder straps 43 and 44, to receive automobile safety belt 47. The free ends of tubular bottom frame 11 and tubular guard rail 25 are provided with protective plastic buttons 48.

Figure 3:
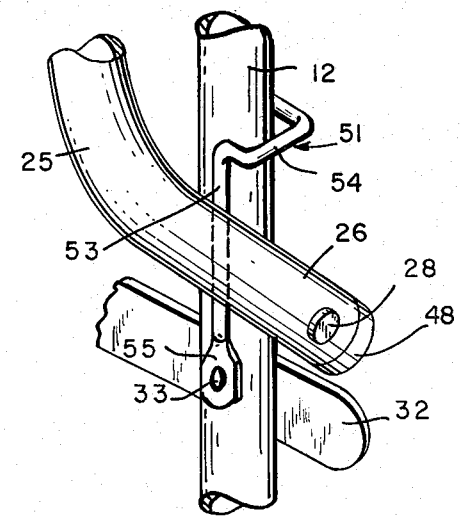
FIG. 3 is similar to FIG. 2 but with the safety lock open and the guard rail in raised position.
Figure 4:
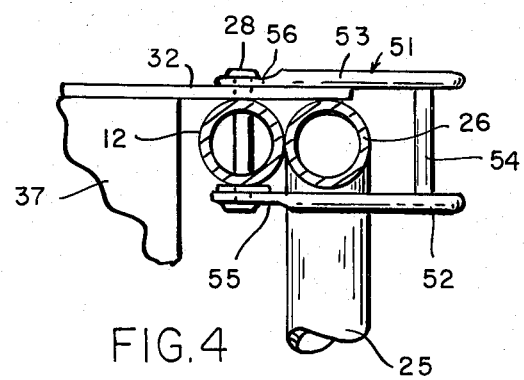
FIG. 4 is a section along line 4—4 of FIG. 2.

The guard rail safety lock 51 of the present invention (see FIGS. 2, 3 and 4) comprises a generally U-shaped member having side arms 52 and 53 and cross-portion 54 pivotally mounted to rivet 33, the rivet holding cross-bar 32. As shown, safety lock 51 is preferably formed of stiff wire and is provided with apertured flattened end portions 55 and 56 located directly under the head portions of rivet 33 overlying the face of back frame 12 in one case and the back of cross-bar 32 in the other. Side arms 52 and 53 are provided long enough so that cross-member 54 will readily clear button 48 on the end of guard rail 25 as safety lock 51 is swung between its open or raised position and its closed or lower position. The portions of side arms 52, 53 adjoining cross-member 54 are preferably bent perpendicualr to the main portion of said arms for a sufficient distance that when corss-member 54 is in contact with the side of back frame 12 the side arm members extend slightly beyond the perpendicular. This slight overbalance tends to cause the safety lock 51 to remain in its open position even though it is freely pivotable about rivet 33.

Figure 2:
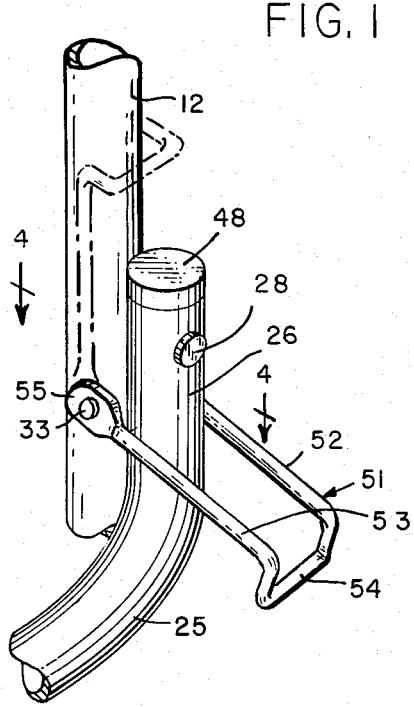
FIG. 2 is a close-up perspective showing a portion of the side rail and guard rail at the juncture thereof with the safety lock of the present invention in a closed position.

As shown in FIG. 2, when safety lock 51 is in its closed position, side arms 52 and 53 closely encompass the sides of tubular guard rail 25 holding guide rail 25 against the extended portions of cross-bar 32 and preventing it from being raised. Safety lock 51 can easily be raised by an adult sitting next to child's seat 10 on the side on which the safety lock 51 is located, to the position shown in dotted lines in FIG. 2, permitting guard rail 25 to be raised (after crotch strap 41 is released) to the raised position shown in FIG. 3. To permit this easy release only one safety lock 51 is provided and this normally on the driver's side, assuming that child's seat 10 is to be placed on the front seat of an automobile next to the driver. The location of safety lock 51 on the other hand, is such that children in the age group normally using such seats will generally be unable to reach and manipulate the safety lock.

I claim:

1. In an infant's car seat of the type having a guard rail pivotally mounted at each end to the corresponding side of the side frame of said seat to rotate between a lowered waist-encircling position and a raised position above the seat and wherein that portion of the guard rail adjacent each said pivot is oriented generally parallel to the corresponding side of the side frame when the guard rail is in its lowered waist-encircling position, a safety lock to optionally retain said guard rail in said lowered position, said safety lock comprising a U-shaped member pivotally mounted to the side frame of said seat at right angles to and below said guard rail pivot, said U-shaped member having side arms adapted to closely overlie said guard rail when both said guard rail and said safety lock are in lowered position and of a length to permit the cross-bar portion of said U-shaped member to clear the end of said guard rail to permit said safety lock to be raised about its pivot to a raised position free from said guard rail.

2. A safety lock as claimed in claim 1, wherein the cross-bar portion of said U-shaped member is displaced from the plane of the side arm portion of said U-shaped member sufficiently that when said safety lock is in its raised position said side arm portions are oriented slightly beyond the perpendicular.

* * * * *